Aug. 14, 1956 E. C. CORNELL, JR 2,759,120
WELDING HEAD CONTROL APPARATUS IN SYSTEMS USING
SEPARATELY EXCITED DC WELDING GENERATORS
Filed Oct. 6, 1951
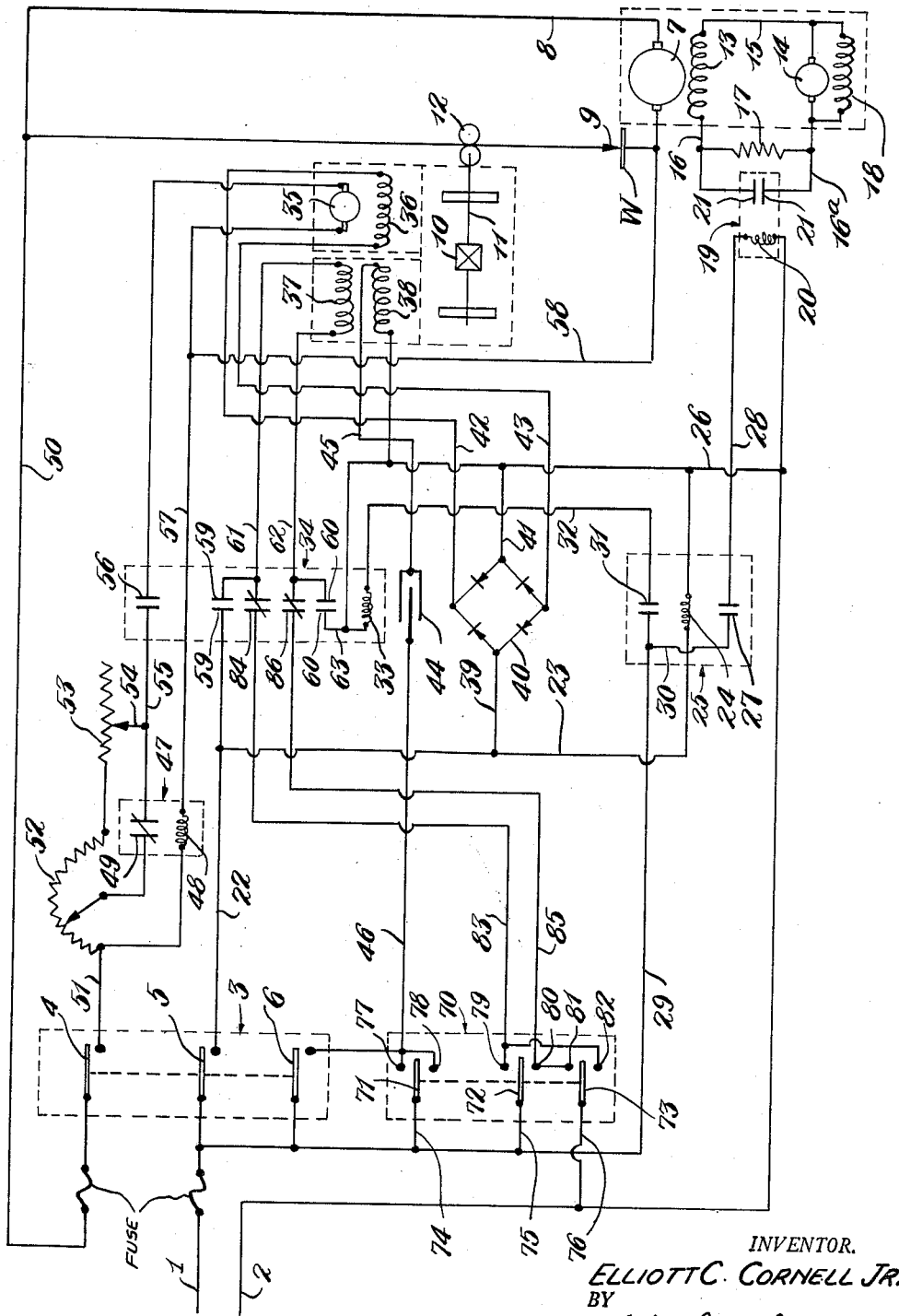
INVENTOR.
ELLIOTT C. CORNELL JR.
BY
ATTORNEYS United States Patent Office 2,759,120
Patented Aug. 14, 1956

2,759,120

WELDING HEAD CONTROL APPARATUS IN SYSTEMS USING SEPARATELY EXCITED D. C. WELDING GENERATORS

Elliott C. Cornell, Jr., Cleveland, Ohio, assignor to The Auto Arc-Weld Manufacturing Company, Cleveland, Ohio, a corporation of Ohio Application October 6, 1951, Serial No. 250,149

10 Claims. (Cl. 314—62)

This invention relates to automatic welding heads, and to control systems for the operation of such heads. The invention has specific reference to a control system especially designed and adapted for use with automatic welding controls used in combination with separately excited D. C. welding generators, while not interfering with use of the control on any other known source of welding current.

Several types of automatic welding heads have heretofore been provided, as exemplified by the structures shown in Patents 1,514,591, 1,514,592 and 1,563,612. The welding heads include two electric motors which connect through a differential to a shaft that controls the feed of the weld rod. The motors are driven in opposite directions with one motor being adapted to drive the weld rod toward the weld and with the second motor being driven so as to lift the weld rod away from the weld. The first of these motors is ordinarily controlled by the current through or voltage on the weld while the second motor usually is a constant speed device.

One type of control apparatus of the general type relating to the present invention is disclosed in my joint U. S. patent application No. 2,516,777, issued July 25, 1950. Such control apparatus works very satisfactorily for use in the control of the automatic welding apparatus wherein A. C. welders or rectifier type D. C. welders are used. However, when a separately excited D. C. welding generator is used, a period of time, such as between one to three seconds, is required for the output voltage of the welding generator to build up its normal high non-welding voltage after the system has been closed for welding action, but before the actual welding operation has started. With such separately exited generators, the system covered in my said U. S. patent has not functioned completely satisfactorily since the down-feed relay did not operate instantly as it does on A. C. and rectifier welders so that the D. C. down-feed motor ran for a short period with little resistance in its armature circuit, hence the electrode would in such instances be fed downwardly too rapidly for continuous welding action so that such rapid feed of the electrode was highly undersirable.

It is the general object of the present invention to provide a novel type of an automatic welding control system especially designed for use with separately excited D. C. welding generators and adapted to overcome the foregoing difficulties with previous control ssytems for automatic welding operations, while maintaining its satisfactory operation with A. C. welders and D. C. rectifier welders.

Another object of the invention is to provide an automatic welding control system characterized by the delay in energization of the control motors in the weld system when the control is actuated for the start of a welding operation.

Another object of the invention is to provide a relatively simple, uncomplicated welding control system of the class described.

Yet another object of the invention is to use time-delay means in the energization circuits of control motors in a welding control system upon actuation thereof and to also control the welding condition upon termination of the welding operation to permit a slight delay in terminating a welding action.

The foregoing and other objects and advantages of the invention will be made more apparent as the specification proceeds.

It should be understood that in welding apparatus of the type referred to, normally the drive motor for the welding generator is started by a separate switch prior to the closing or activation of the weld control system. Such motor for the welding generator also usually starts or closes the field energization circuit of the welding generator.

Reference is made to the accompanying drawing which shows an elementary wiring diagram of a control system embodying the process of the invention.

The present invention, broadly speaking, relates to automatic welding control apparatus for use with a welding system having a field winding and separate excitation means for such winding, and the apparatus for such invention comprises suitable means for feeding an electrode to a weld and including a pair of motors for feeding the electrode in opposite directions, means adapted to be connected to the welding generator and be controlled by the voltage thereof for connecting a resistance in the circuit of one of said motors before a weld arc is struck to slow such motor down, which motor moves the electrode toward the work, and time-delay means for closing the operating circuits of the said motors a predetermined controllable interval after the apparatus has been actuated to start the control of a continuous welding operation.

Attention now is particularly directed to the details of the apparatus and circuit control means provided, and a pair of power supply leads 1 and 2 are shown that are adapted to be connected to a suitable source of alternating current power supply. A starting switch 3 is provided and it controls a plurality of contacts 4, 5 and 6. The power supply lead 1 connects to the input terminals of the contacts 5 and 6.

The actual welding circuit to be controlled by the starting switch 3 includes a welding generator 7 which has a welding circuit 8 connected thereto with an electrode 9 being represented therein for movement toward the work to be welded, which work is indicated by the letter W. Conventional control means are provided for feeding the electrode 9 toward or from the work W and such means include differential gears 10 connected to a shaft 11 that in turn connects to suitable means, such as rolls 12, that engage the electrode 9 and move it in a desired direction with relation to the weld. It will be understood that normally when starting a welding operation, the electrode 9 will be separated appreciably from the work W so that the initial action of the control means must be to bring the electrode up to the work surface at a desired speed to start and maintain a continuous welding operation.

The welding generator 7 has a separately excited field 13 provided therefor, which field 13 connects to a suitable power source, such as a generator 14 by leads 15 and 16. The lead 16 has a relatively high resistance 17, or equivalent means, provided therein which serves to reduce the current passing through the field 13 to a relatively low value so that the welding generator 7 produces only a minimum amount of voltage when the generator 7 is being driven but before the welding circuit has been closed through the generator 7 and before the weld control circuit is closed. The generator 14 is driven in any conventional manner and has a field coil 18 provided therefor.

When it is desired to have welding conditions established for the generator 7, it is necessary to remove the resistance 17 from the excitation circuit of the field 13 and in this embodiment of the invention, applicant has provided a relay 19 that has an operating coil 20 and which is adapted to close a pair of contacts 21 when the relay 19 is operated so that the contacts 21 close a low resistance circuit through a lead 16a in parallel to the resistance 17 and permit the voltage output of the generator 7 to build up to a desired welding value. Normally, it takes a period of from about one to three seconds to build up the welding generator 7 to its full voltage before weld current is established so that the generator 7 will have a voltage output at such time of between 50 and 60 volts, for example. When the starting switch 3 is closed, contact 5 supplies power to a lead 22 that in turn has a lead 23 extending therefrom and connected thereto. Such lead 23 extends to an operating coil 24 of a time-delay relay indicated in general by the number 25. The other terminal of the operating coil 24 connects to the power supply lead 2 by a lead 26. While it is not necessary in all instances, the operating coil 20 of the relay 19 connects to a power source through a pair of contacts 27 controlled by the time-delay relay 25 by means of a lead 28 extending to one contact 27. The opposite contact 27 connects to the power supply lead 1 by means of leads 29 and 30, as shown, whereas the other side of the operating coil 20 connects to the power supply lead 2. The time-delay relay 25 is so constructed that upon actuation of the coil 24, or energization thereof, the contacts 27 will be closed immediately so that upon the closing of the starting switch 3, the relay 19 will be actuated and short-circuit the resistance 17 in the excitation circuit of the welder generator field.

A second pair of contacts 31 are also provided in the time delay relay 25 and power is supplied to one such contact from power supply lead 1 through lead 29. The other of the contacts 31 connects by a lead 32 to an operating coil 33 of an interlock relay 34. Such interlock relay 34 is provided to close the energization circuits of two control motors provided for controlling the gears 10 and hence the drive shaft 11 in accordance with conventional welding electrode feed practice in the automatic welding industry. Usually the two control motors provided include a down-fed D. C. motor which has an armature 35 and a field 36, while an A. C. motor is provided for driving the shaft 11 oppositely to the D. C. motor and it includes two operating fields 37 and 38.

The field 36 of the D. C. motor is energized immediately upon closing the switch 3 through a lead 39 that connects a suitable rectifier 40 to the lead 23 that connects to the switch 5 by lead 22. The opposite side of the rectifier 40 connects to the power supply lead 2 through a lead 41 that connects to the lead 26. The actual power supply to the field 36 is provided by leads 42 and 43 which connect the rectifier 40 to such field 36.

In this embodiment of the invention, one of the fields of the A. C. control motor is a capacitor type of field and is shown as having a suitable condenser 44 connected in series with the field 38 by a lead 45. The other terminal of the field 38 connects to the lead 26 that in turn connects to the power supply lead 2 whereas the opposite terminal of the condenser 44 connects to contact 6 by means of a lead 46 so that power is supplied to the capacitor field 38 of the A. C. motor immediately upon the closing of the starting switch 3.

In order that a desired slow-down feed resistance be present in the armature circuit of the D. C. motor before the motor is started, a conventional control device, such as a relay 47, is provided in such armature circuit. The control relay 47 has an operating coil 48 and a pair of contacts 49 that normally are closed. The operating coil 48 is controlled by the voltage output of the welding generator 7, and when such voltage is at a non-welding maximum, such voltage is adapted to actuate the coil 48 and open the contacts 49. A lead 50 connects one side of the welding generator 7 to the contact 4 of the starting switch. Contact 4 of the starting switch is connected by a lead 51 to a variable resistance 52 and then usually to a second resistance 53. An adjustable contact 54 is provided for connection to the resistance 53 and it connects to a lead 55 that extends through a pair of contacts 56 in the interlock relay 34 to one terminal of the armature 35. The opposite terminal of the armature connects to the operating coil 48 of the relay 47 by a lead 57. The remaining and opposite terminal of the welding generator 7 connects to the lead 57 by a lead 58, as shown. Hence, after the voltage output of the generator 7 has risen to a desired value prior to the start of the welding operation, the operating coil 47 will be energized to open the contacts 49 and such a condition will arise prior to the energization of the two control motors provided for the electrode 9 by proper adjustment of the time-delay relay 25 in closing the contacts 31. After closing of the starting switch 3, the delay relay 25 will cause the interlock relay 34 to be actuated and such relay, when it closes, closes the contacts 56 to permit the D. C. motor to start. The interlock relay 34 also has pairs of contacts 59, 59 and 60, 60 therein that are closed when the relay is actuated. The contacts 59 at one terminal thereof connect through the lead 22 and contact 5 to a power supply lead whereas the other terminal 59 connects through a lead 61 to one side of the A. C. operating field 37. The opposite terminal of the field 37 connects by a lead 62 to one of the terminals 60 and the opposite terminal 60 connects by a lead 63 to the lead 26 that extends to the opposite power supply lead 2.

After the D. C. and A. C. control motors have been energized for operation, the D. C. control motor provided will cause the welding electrode 9 to be moved into its weld position at a desired rate. When welding conditions are established, the voltage output of the generator 7 will drop to its normal operating voltage and the relay 47 will be released or deenergized sufficiently so that contacts 49 will again close and the high resistance normally present in the armature 35 will be removed therefrom for normal welding operating conditions.

The circuit of the generator 14 may include surge capacitors and bleeder resistors, for example, as required to protect the relay contacts and the generator field insulation. Since it is desirable in many instances to adjust the position of the electrode 9, prior to the actual closing of the circuit for setting up welding operation, an "inching" switch 70 is also provided in the apparatus. This inching switch 70 connects only to the A. C. motor in the system and includes contacts 71, 72 and 73. These contacts are suitably connected to the power supply lead 1 through the lead 29 and leads 74, 75 and lead 2 through lead 76,, respectively. Each of the contacts 71, 72 and 73 is pivotally positioned and has pairs of reversing contacts provided for engagement therewith to move the electrode 9 either toward or away from the weld position, as desired. Pairs of contacts 77 and 78, 79 and 80, and 81 and 82 are provided, respectively, for the contacts 71, 72 and 73. The contacts 77 and 78 are suitably connected to the lead 46 for transmission of power to the condenser 44 and from there to the other power supply lead through the circuits previously described. The contacts 79 and 82 connect through a lead 83 to a pair of normally closed contacts 84 that connect to one power supply lead 61 of the motor field 37. The other contacts 80 and 81 of the inching switch 70 connect between a lead 85 to a second pair of normally closed contacts 86 in the interlock relay 34 and from the opposite contact 86, they are connected to the lead 62 which connects the opposite side of the field 37. Hence movement of the control means for the inching switch 70 in one direction causes operation of the A. C. motor of the system in one direction, and movement of the control means in the opposite direction will cause reverse rotation of such A. C. control motor and desired reverse movement of the electrode 9 so that it can be positioned in a desired starting position prior to the closing of the starting switch 3 of the weld control system.

It will be appreciated that energization of the interlock relay 34 opens the contacts 84 and 86 so that power is supplied to the field 37 through the sets of contacts 59 and 60 of such relay.

It should be appreciated that any conventional time-delay means may be provided in the relay 25 for retarding the opening of the contacts 27 when the starting switch 3 is opened so that retention of the high welding voltage output by the generator 7 is permitted and the welding operation is briefly continued to avoid the formation of a crater at the end of the weld. As indicated, the time delay in closing the contacts 31 after closing the starting switch 3 should be adjustable so that such contacts are not closed until the desired voltage has been established in the generator 7 and the high resistance has been placed in the circuit of the armature 35.

It is thought that in some apparatus, other means than that disclosed can be used for controlling the voltage output of the generator 7 and that the resistance 17 need not be provided in all instances.

It will be noted that the apparatus will quickly take out the resistance 53 in the D. C. motor armature as soon as a weld is started so that the system will operate normally for continued weld action. It is submitted that a relatively uncomplicated starting and control circuit of the class described has been provided and that the objects of the invention have been achieved.

While one complete embodiment of the invention has been disclosed herein, it will be appreciated that modification of this particular embodiment of the invention may be resorted to without departing from the scope of the invention as defined by the appended claims.

Having thus described my invention, what I claim is:

1. In automatic welding apparatus for use with a welding generator having a field and separate excitation means for the generator field, the combination comprising a resistance for being connected in series with the generator field, a relay for controlling the connection of said resistance in the generator field circuit, a welding electrode feed control, a D. C. and an A. C. motor for driving said electrode feed control in opposite directions, a resistance connectable into the armature circuit of said D. C. motor, a control relay adapted to be controlled by the voltage output of the welding generator for inserting said second-named resistance in the armature circuit, time-delay means for closing the circuits of said D. C. and A. C. motors to start same in delayed relation to the closing of the energization circuit for said first named relay, and means for simultaneously energizing said first-named relay and said time delay means.

2. In automatic welding apparatus for use with a welding generator having a field and separate excitation means for the generator field, the combination comprising a welding electrode feed control, a D. C. and an A. C. motor for driving said electrode feed control in opposite directions, a resistance connectable into the armature circuit of said D. C. motor, a control relay adapted to be controlled by the voltage output of the welding generator for inserting said resistance in the armature circuit, and time-delay means for closing the circuits of said D. C. and A. C. motors to start same in time delayed relation to the energization of the welding generator, said time delay means instantly closing the energization circuit of the welding generator when the time delay means are energized.

3. In automatic welding apparatus, a welding generator having a field, separate excitation means for said field, a resistance connected in series with said field, a relay for controlling the connection of said resistance in said field circuit, a welding electrode feed control, a D. C. and an A. C. motor for driving said electrode feed control in opposite directions, a resistance for connection in the armature circuit of said D. C. motor upon starting high non-welding voltage output by said generator, a control relay controlled by an above-welding voltage output of said generator for inserting said resistance in the armature circuit, a relay when energized for starting said D. C. motor, and time-delay means for closing the circuits for energizing said first named relay a predetermined interval prior to the energization of said last-named relay.

4. In automatic welding apparatus, a welding generator having a field, separate excitation means for said field, a resistance connected in series with said field, a relay for controlling the connection of said resistance in said field circuit, a welding electrode feed control, a D. C. and an A. C. motor for driving said electrode feed control in opposite directions, a resistance in the armature circuit of said D. C. motor, a control relay controlled by the voltage output of said generator for inserting said resistance in the armature circuit, a relay for starting said D. C. motor and controlling the energization circuit of said A. C. motor when energized, time-delay means for closing the circuits for energizing said first relay immediately upon energization of said time-delay means and for energizing said motor starting relay at an interval after energization of said time-delay means and a starting switch to close an energization circuit for said time-delay means and for connecting said generator to said control relay.

5. In automatic welding apparatus for use with a welding generator having a field winding and separate excitation means for said field winding, the combination comprising a resistance connectable into the circuit of said field winding, means for controlling the connection of said resistance, means for feeding an electrode to a weld and including a pair of motors for feeding the electrode in opposite directions, means adapted to be controlled by the voltage output of the welding generator for connection in the circuit of the one of said motors to slow it down, which motor moves the electrode towards the weld, and time delay means for closing the circuits to said motors, and said first-named means.

6. In an automatic welding apparatus, a welding generator, separate excitation means for the welding generator and including an armature and a field winding, a welding head having a movable electrode feed control, a D. C. motor having a field winding and an armature winding for moving the electrode feed control in one direction, and an A. C. motor for moving the electrode feed control in the opposite direction to the movement thereof by the D. C. motor, a resistance connected in the separate excitation means, a relay for shorting out said resistance, a starting switch for connection to a power supply, a time-delay relay connected to said starting switch for energization thereby, means connecting said time-delay relay to said starting switch for energization therethrough immediately upon the closing of said starting switch, a resistance connected in the armature circuit of said D. C. motor, a relay normally connected to short out said last-named resistance and connected through said starting switch to said welding generator to insert said last-named resistance in said armature circuit dependent upon the voltage output of said welding generator, a control relay for closing the armature circuit of said D. C. motor, and means connecting said time-delay relay to the last-named control relay to energize same in predetermined time relation to the shorting out of said resistance in said separate excitation means.

7. In an automatic welding apparatus, a welding generator, separate excitation means for the welding generator and including an armature and a field winding, a welding head having a movable electrode feed control, a D. C. motor having a field winding and an armature winding for moving the electrode feed control in one direction, an A. C. motor having a capacitor field and a second field for moving the electrode control in the opposite direction to the movement thereof by the D. C. motor, a resistance connected in the separate excitation means, a relay for shorting out said resistance, a starting switch for connection to a power supply, said capacitor field being connected to said starting switch, a time-delay relay connected to said starting switch for energization thereby, means connecting said time-delay relay to said starting switch for energization therethrough immediately on closing said starting switch, a resistance connected in the armature circuit of said D. C. motor, a relay normally connected to short out said last-named resistance and connected through said starting switch to said welding generator to insert said last-named resistance in said armature circuit dependent upon the voltage output of said welding generator, a control relay for closing the armature circuit of said D. C. motor, and means connecting said time-delay relay to the last-named control relay to energize same at an interval after said starting switch is closed, said second field of said A. C. motor being connected to said last-named relay for energization therethrough.

8. In an automatic welding apparatus, a welding generator, separate excitation means for the welding generator and including an armature and a field winding, a welding head having a movable electrode feed control, a motor for moving the electrode feed control towards a weld position, and a second motor having a capacitor field and a second field for moving the electrode feed control away from the weld position, a resistance connected in the separate excitation means, a relay for shorting out said resistance, a starting switch, said capacitor field being connected to said starting switch and being energized by the closing thereof, a time-delay relay connected to said starting switch for energization thereby, means operatively connecting said first named relay to said starting switch for energization thereof immediately upon the closing of said starting switch, a resistance connected in a circuit of said first motor, a relay normally connected to short out said last-named resistance and connected through said starting switch to said welding generator to insert said last-named resistance in said first motor circuit dependent upon the voltage output of said welding generator, means for closing the said circuit of said first motor, and means connecting said time-delay relay to said last-named means to energize same, said second field of said second motor being connected to said penultimate means for energization therethrough.

9. Automatic welding control apparatus comprising a welding generator, a field winding for said welding generator, a resistance connected in series with said field winding, means for shorting said resistance out of said field winding circuit, a welding electrode feed control, motors for controlling said welding electrode feed control, means for closing the starting circuits for said motors, and time-delay means connected to said motor starting circuit means for closing the energization circuit thereto at an interval after energization of said time-delay means, said time-delay means being connected to said resistance shorting means to actuate same immediately when said time-delay means is energized.

10. In automatic welding apparatus for use with a welding generator having a field winding and separate excitation means for said field winding, the combination comprising means for feeding an electrode to and from a weld and including a pair of motors for feeding the electrode in opposite directions, means adapted to be controlled by the voltage output of the welding generator for connection in the circuit of the one of said motors to slow it down, which motor moves the electrode towards the weld, time delay means for closing the circuit to the motor to feed the electrode away from the weld, and a starting switch for connection to a power supply source, said second-named means including a relay having an operating winding adapted to be connected to the welding generator through said starting switch, and said time-delay means being connected to said starting switch for energization therethrough.

References Cited in the file of this patent
UNITED STATES PATENTS

| | | |
|---|---|---|
| 2,364,372 | Kenrick | Dec. 5, 1944 |
| 2,468,570 | Nyburg | Apr. 26, 1949 |